(No Model.)  2 Sheets—Sheet 1.

E. S. SCOFIELD.
PROTECTING SUPPORTER FOR FRUIT PACKAGES.

No. 262,132. Patented Aug. 1, 1882.

Attest.
Chas. F. Spencer
R. E. White

Inventor.
Edward S. Scofield
per R. F. Osgood,
atty.

(No Model.) 2 Sheets—Sheet 2.
E. S. SCOFIELD.
PROTECTING SUPPORTER FOR FRUIT PACKAGES.
No. 262,132. Patented Aug. 1, 1882.
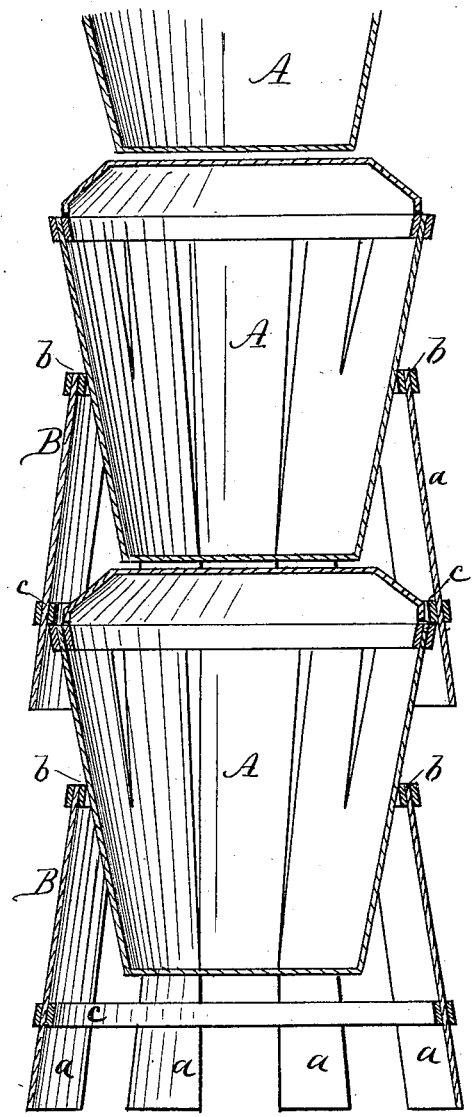
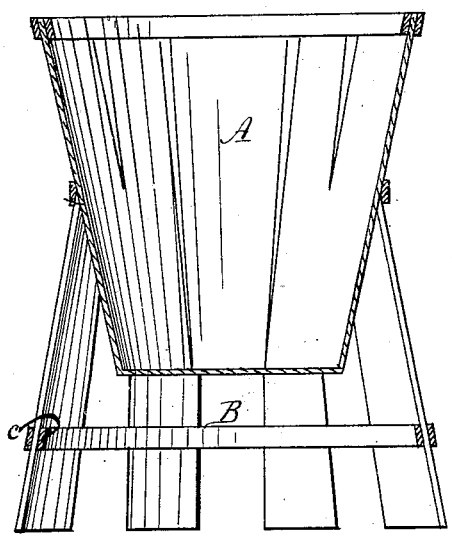
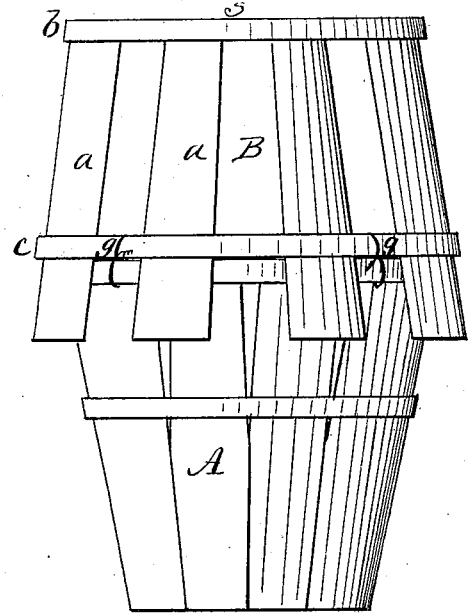
Attest.
Chas. F. Spencer
R. E. White
Inventor.
Edward S. Scofield,
pr R. F. Osgood,
atty.

UNITED STATES PATENT OFFICE.

EDWARD S. SCOFIELD, OF RIDGEWAY, ASSIGNOR TO SELDEN D. REDMAN, OF NEW YORK, N. Y.

PROTECTING-SUPPORTER FOR FRUIT-PACKAGES.

SPECIFICATION forming part of Letters Patent No. 262,132, dated August 1, 1882.

Application filed March 27, 1882. (No model.)

*To all whom it may concern:*

Be it known that I, EDWARD S. SCOFIELD, of Ridgeway, Orleans county, New York, have invented a certain new and useful Improvement in Protecting-Supporters for Fruit and Other Packages; and I do hereby declare that the following is a full, clear, and exact description of the same, reference being had to the accompanying drawings, in which—

Figure 1:
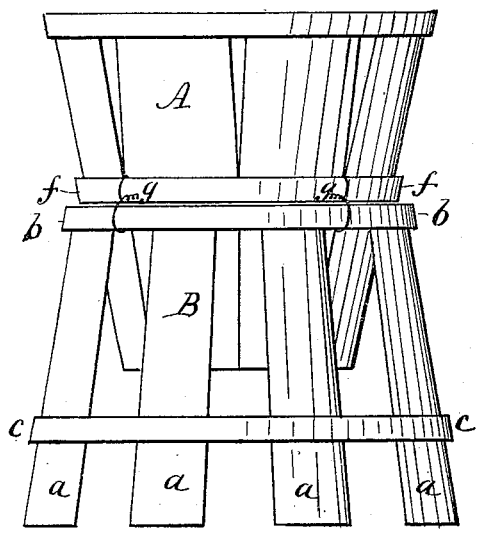
Figure 3:
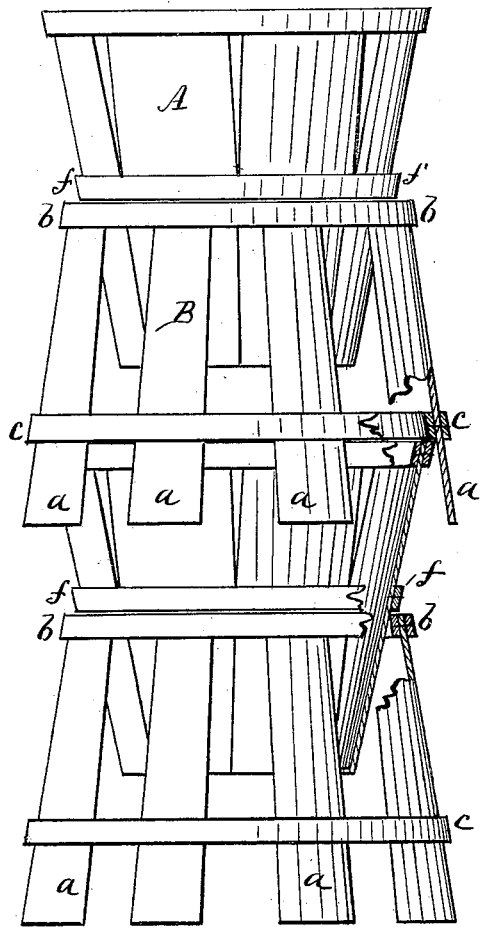
Figure 2:
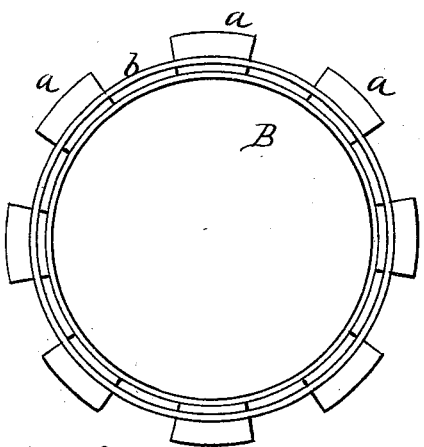

Figure 1 is an elevation of one of the packages and its supporter. Fig. 2 is a plan of the support. Fig. 3 is an elevation, partly in section, of two of the packages and supports ready for transportation. Fig. 4 is a vertical section of two of the packages and their supports, showing the packages provided with covers. Fig. 5 is a section of the package and supporter made entire and as one device. Fig. 6 is an elevation showing the supporter attached on top of the package.

My improvement relates to packages for containing and transporting fruits and other products.

Ordinary peach-baskets are filled with fruit and covered with mosquito-net or other fabric or material, and are then placed in cars for transportation, being laid on the sides in tiers one above another, or packed upright one above another, or packed on shelves at the sides of the cars. When placed on the sides in tiers the fruits or other products are liable to be crushed or injured, they occupy much space, and, owing to their size and peculiar shape, they are liable to shake about and be displaced. When packages are placed upright one above another they are liable to be overturned, owing to the base being smaller than the top. The actual damage to the materials shipped as above described is estimated at from fifteen to twenty-five per cent. of the marketable value of the same.

To obviate these difficulties and prevent the damage to the fruit or other product is the object of my invention, which consists of protecting supporters used in combination with baskets or similar packages, as hereinafter described and set forth, so that said baskets or packages can be nested and built up one above another to any desired height and have a firm support, as will be more fully described.

In the drawings, A shows an ordinary peach-basket.

B is the protecting supporter or guard which forms the subject of my invention. The same consists of an open-ended frame conforming to the package, being largest at the bottom and smallest at the top, where the package has sloping sides. It is preferably made of strips *a a*, of thin wood, paper, or other material, or, if desired, of a continuous sheet of such material. *b b* and *c c* represent hoops or stops, inside and outside, between which the staves, strips, or layers rest, being tacked or nailed. The staves extend below the lower hoops a sufficient distance to sustain the same in a proper position on the basket or package below. The basket or package has an exterior hoop, *f*, midway or thereabout, as shown, although in some cases such hoop may be dispensed with.

In packing for transportation the basket or package A is set into the smaller end of the supporter B, the hoop or stop *f* of the basket resting upon the top of the supporter and having its bearing at that point. The bottom of the basket sinks into the supporter. The two are then tied, wired, or otherwise fastened together, as shown at *g g*, or are left unfastened, if desired. The basket with the supporter thus connected has a wide base, preventing its overturning under any ordinary circumstances. The second basket and its supporter are connected in the same manner, and the wide base end of the second supporter, which stands downward, fits over the top of the first basket, the inner hoop or stop, *c*, of the supporter resting on top of the basket. This gives a firm and wide base for the second basket, and others may be built up in the same manner to any desired height, as shown in Figs. 3 and 4. When so built up in stacks the supporters hold and sustain the baskets in a perpendicular position, preventing the same from shaking, being displaced, or overturning, or in any manner injuring, crushing, or harming the fruits or other products contained in the baskets. The baskets reach down into the supporters so that the bottom of one basket nearly or quite touches the contents of the next, very little space thus being lost in packing.

The baskets and supporters are preferably wired or otherwise attached together with the supporter at the bottom, as shown in Fig. 1, as they are thus convenient in handling and do not interfere with filling; but, if desired, the parts may be used separate, or the supporter can be wired or otherwise attached to the top of the basket, as shown in Fig. 6. If desired, also, the supporter may be made as a part of the basket itself, all in one device, as shown in Fig. 5. Rigid or stiff covers may also be used on the packages, as shown in Fig. 4, in which case the supporters are used in the same manner, and the bottom of one basket reaches nearly or quite to the cover of the next. The middle hoop or stop of the baskets may be dispensed with, as shown in said figure, the sides of the basket being made of sufficient stiffness to retain it in place. In case of baskets or packages with perpendicular sides without supporting hoops or stops, the supporting hoop or stop for the upper basket may be on the inside of the supporter at a distance from the top of the same.

When the packages have reached their destination the supporters can be detached and nested together and returned, leaving the baskets in perfect condition, and thus saving the expense of new supporters.

Having thus described my invention, I claim—

1. The protecting-supporter B, constructed of strips of wood, paper, or other material, bound by hoops and made open at both ends to receive the basket or package and forming a base to said package, as herein shown and described.

2. The package A and supporter B, the package resting within the top of the supporter, the supporter forming a base to the same, the supporter having on its inside and near the bottom a hoop, c, which forms a stop to rest on top of the package below, the package and supporter being made in one body, as herein shown and described.

3. The combination of the package A and the supporter B, made open at both ends, the small end of the package fitting in the small end of the supporter and being supported by it, the bottom of the supporter being of greater diameter to form a firm base, as set forth.

4. The combination of two or more packages, A A, and two or more supporters, B B, arranged in pairs, the small ends of each package and of its supporter fitting together, and the large end of each supporter fitting on top of the package below it, thus forming a stack, as herein shown and described.

In testimony whereof I have hereunto signed my name in the presence of two subscribing witnesses.

EDWARD S. SCOFIELD.

Witnesses:
CHAS. S. SCOFIELD,
E. C. BENNETT.